United States Patent Office 3,557,190
Patented Jan. 19, 1971

3,557,190
PREPARATION OF 1-(CARBAMOYL)-N-(CARBAMOYLOXY)THIO-FORMIMIDATES FROM ALKYL ACETOACETATES
James B. Buchanan, Wilmington, Del., assignor to E. I. du Pont de Nemours and Company, Wilmington, Del., a corporation of Delaware
No Drawing. Filed Dec. 27, 1968, Ser. No. 787,600
Int. Cl. C07c *161/00*
U.S. Cl. 260—482
19 Claims

ABSTRACT OF THE DISCLOSURE

1 - (carbamoyl) - N-(carbamoyloxy)thioformimidates such as methyl 1-(carbamoyl)-N-(methylcarbamoyloxy) thioformimidate and methyl 1 - dimethylcarbamoyl)-N-(methylcarbamoyloxy)thioformimidate are prepared by the steps of
(a) chlorinating an alkyl acetoacetate in the presence or absence of a solvent such as water or an alcohol;
(b) reacting the produce of (a) with an alkyl nitrite in water or an alcohol at −20 to 50° C.;
(c) mixing the hydroxamoyl chloride formed in (b) with an alkyl mercaptan and then adding a base;
(d) reacting the product of (c) with 2 moles of ammonia or an amine in the presence of water or an alcohol; and
(e) reacting the product of (d) with either
  (1) a carbamoyl chloride, in the presence of a base; or
  (2) an isocyanate, optionally in the presence of a basic catalyst; in water or organic solvents such as acetone and methylene chloride.

BACKGROUND OF THE INVENTION

This invention relates to methods for preparing 1-(carbamoyl)-N-(carbamoyloxy)thioformimidates. More particularly, this invention is directed to methods of preparing the thioformimidates by chlorinating an alkyl acetoacetate, reacting the product with an alkyl nitrate, reacting the resulting hydroxamoyl chloride with an alkyl mercaptan in the presence of a base, then aminating, and then preparing the desired thioformimidates by reaction with either a suitable carbamoyl chloride in the presence of a base or a suitable isocyanate usually in the presence of a basic catalyst.

The product thioformimidates are useful as pesticides and can be prepared in the manner disclosed in copending application Ser. No. 728,739, filed May 13, 1968. They can also be prepared from glyoxylic acid in the manner disclosed and claimed in copending application Ser. No. 772,811, filed Nov. 1, 1968.

While it has been known in the art that chlorinations such as step (a) were feasible, see J. Am. Chem. Soc., 61, 892 (1939), and that alkyl chloroacetoacetates could be oximated, see G. Hesse and G. Krehbiel, Ber., 88, 130 (1955), such reactions resulted in poor product yields (less than 60%), and involved the use of ethyl ether as a solvent saturated with hydrogen chloride. By the methods of this invention it is possible to carry out these steps without the use of ethyl eher which is both hazardous and inconvenient, with the use of only small amounts of hydrogen chloride, and with much improved yields (greater than 80%). Moreover, by the methods of this invention it is possible to prepare the thioformimidates of Formula 1 below in a five-step process in which the first four steps can be operatively combined. By thus avoiding the necessity to separate and recover intermediate compounds the methods of this invention permit economic preparation of the compound of Formula 1 below in outstanding yield.

SUMMARY

This invention is directed to the preparation of 1-(carbamoyl)-N-(carbamoyloxy)thioformimidates of the following formula (1) 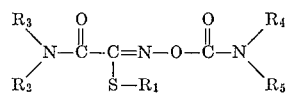

wherein
$R_1$ is alkyl of 1 through 4 carbon atoms or alkenyl of 3 through 4 carbon atoms;
$R_2$ is hydrogen, alkyl of 1 through 4 carbon atoms, alkenyl of 3 through 4 carbon atoms, methoxy, or cycloalkyl of 3 through 5 carbon atoms;
$R_3$ is hydrogen, alkyl of 1 through 4 carbon atoms or alkenyl of 3 through 4 carbon atoms; with the proviso that $R_2$ and $R_3$ can be joined and are alkylene of 2 through 6 carbon atoms, and with the limitation that $R_2$ and $R_3$ never total more than 7 carbon atoms;
$R_4$ is alkyl of 1 through 3 carbon atoms, allyl or propargyl; and
$R_5$ is hydrogen or methyl;

by the steps comprising:
(a) Chlorinating an alkyl acetoacetate in the presence or absence of water, methanol, ethanol, isopropanol or their mixtures at a temperature between 0° C. and 70° C.;
(b) Reacting the product of (a) with an alkyl nitrite in the presence of hydrogen chloride, and in the presence of water, methanol, ethanol, isopropanol or their mixtures at a temperature between −20° C. and 50° C.;
(c) Mixing the product of (b) with an alkyl mercaptan, then adding base to the reaction mixture;
(d) Aminating the product of (c) with 2 moles of ammonia or an amine in the presence of water or alcohol; and
(e) Reacting the product of (d) with either (1) carbamoyl chloride in the presence of a base; or (2) an isocyanate in the presence or absence of a basic catalyst; in water, acetone, methylene chloride, methyl ethyl ketone, or methyl isobutyl ketone.

The compounds of Formula 1 and their use as pesticides are described and exemplified in application Ser. No. 728,739, referred to above.

DESCRIPTION OF THE INVENTION

The process of this invention used in preparing the compounds of Formula 1 comprises the five steps enumerated above, and more fully described as follows:

Step (a): The formation of an alkyl 2-chloroacetoacetate by chlorination of an alkyl acetoacetate is represented by the following equation:

(a) 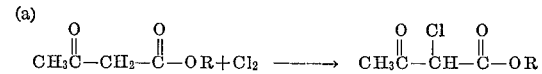

wherein R is methyl, ethyl or isopropyl.

The chlorination can be carried out with chlorine, an alkali hypochlorite, or sulfuryl chloride, with the latter the preferred chlorinating agent in the absence of solvent. It can also be carried out in the presence of solvents such as water, methanol, ethanol, isopropanol and their mixtures, and when water is used elemental chlorine is the preferred chlorinating agent. When solvents are used the concentration of the acetoacetic ester will ordinarily range between about 10 and 50% by weight. Of the acetoacetates the ethyl ester is the preferred starting material.

The alkyl acetoacetate is ordinarily charged to the reaction vessel along with a solvent if one is used. The chlorinating agent is then added gradually in an amount ranging from about stoichiometric to an excess of about 5%. The temperature range during chlorination is about 0 to 70° C. and for convenience and economy is preferably kept between about 20 and 50° C.

After addition of the chlorinating agent is complete, the reaction mixture is heated at about 50° C. for a short period of time to complete the reaction. The product can then be recovered and purified or the step (b) reaction can be carried out without isolating the alkyl chloroacetoacetate.

Step (b): Step (b) comprises formation of the hydroxamoyl chloride and is illustrated by the equation (b)

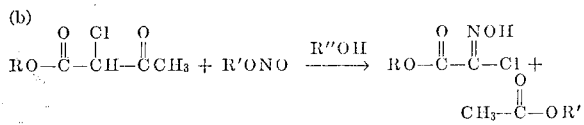

wherein R is as defined in step (a), R' is methyl, ethyl or isopropyl and R'' is hydrogen, methyl, ethyl or isopropyl.

If the product of step (a) has been prepared in the absence of a solvent, solvent is added prior to the reaction of step (b) in an amount sufficient to give a concentration of alkyl 2-chloroacetoacetate of from about 10 to 50% by weight.

Suitable alkyl nitrites can be prepared by methods known to the art such as disclosed in Organic Synthesis, Vol. II, page 204, page 363. Preferred nitrites are the methyl and ethyl nitrites, which can be generated and fed simultaneously to the reaction mixture at a desired rate. Alternatively, the nitrites can be prepared and condensed by chilling and then be vaporized when used in reaction (b).

The nitrosation is ordinarily carried out at a temperature between about −20° C. and 50° C., and preferably between 0° C. and 10° C. The amount of nitrite used will range from about stoichiometric to a slight excess based on the product of step (a). The nitrite is usually added over a period of about an hour and after addition is complete the mixture is stirred while the temperature gradually rises to about 25° C. The hold period is usually several hours with four hours not unusual.

The reaction of step (b) is catalyzed by the presence of small amounts of hydrogen chloride. Ordinarily 1 to 2% by weight of hydrogen chloride based on the weight of chloroacetoacetic ester is sufficient. If hydrogen chloride is used to generate the nitrite used, sufficient hydrogen chloride is present in the nitrite to catalyze the reaction of step (b).

Suitable solvents include water, methanol, ethanol, isopropanol and their mixtures, with the alcohols preferred and ethanol most preferred as a solvent. The product of step (b) can be isolated by filtration, extraction or evaporation of solvent but it is preferred to go directly to step (c) without isolating the product of step (b).

Step (c): The hydroxamoyl chloride from step (b) is mixed with an alkyl mercaptan in a solvent and then the pH is raised by addition of a base according to the equation (c)

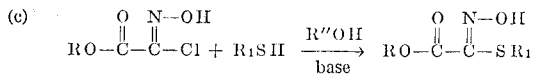

wherein R, R'' and $R_1$ are as defined above.

For best yields the reaction product of step (b) is cooled to below 20° C. prior to addition of the mercaptan. A temperature range of 0 to −10° C. is most preferred.

Bases suitable for adjusting the pH are the hydroxides, carbonates and bicarbonates of sodium, potassium, calcium and magnesium. The final pH should be between 5 and 9 and a pH of about 7 is preferred.

The product can be isolated if desired by conventional techniques such as filtration or solvent extraction. Alternatively, the product mixture can be used as in step (d).

Step (d): The product of step (c) is reacted with an amine in the presence of water, methanol, ethanol, isopropanol or their mixtures according to the equation (d)

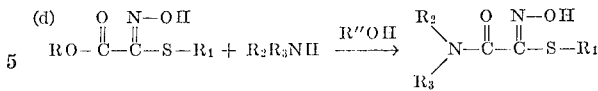

wherein R, R'', $R_1$, $R_2$ and $R_3$ are as defined above.

If the product of step (c) was isolated it is first dispersed with stirring in the solvent medium, preferably in one of the alcohols or an alcohol-water mixture.

To this mixture is added approximately 2 moles of ammonia, or a primary or secondary amine. A tertiary amine such as trimethylamine can be substituted for one mole of these amines with about the same result. Two moles of amine are necessary because one mole forms a salt with the oxime function while another mole participates directly in the reaction.

The product of step (d) can be isolated in a conventional manner such as by filtration or evaporation of the solvent. It is desirable to isolate this product or at least to remove any excess ammonia or amine, prior to performing the reaction of step (e).

Step (e): Conversion of the product of step (d) to the oxime carbamate is carried out by reacting the product of step (d) with an isocyanate or a carbamoyl chloride according to the equation ($e_1$)

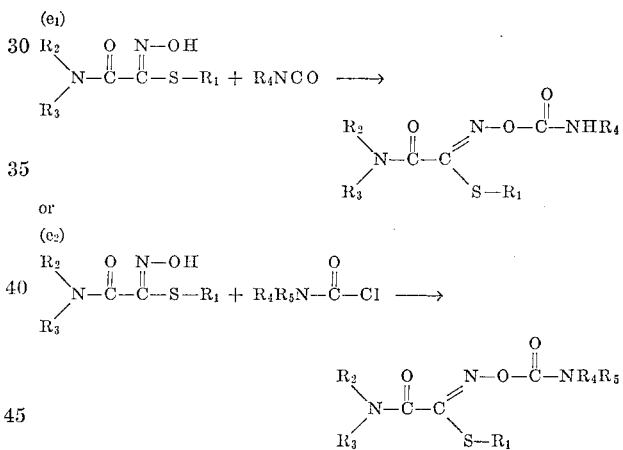

or ($e_2$)

wherein $R_1$, $R_2$, $R_3$, $R_4$ and $R_5$ are as defined above. The reactions of step (e) are carried out in a solvent such as water, acetone, methyl ethyl ketone, methyl isobutyl ketone, or methylene chloride, at a temperature which can range from below −10° C. to the boiling point of the solvent. Use of anhydrous solvents is preferred. The reaction of step ($e_1$) is facilitated by the presence of a basic catalyst such as trimethylamine or triethylenediamine. The reaction of step ($e_2$) is carried out in the presence of a base such as triethylamine, trimethylamine or the hydroxides, carbonates or bicarbonates of sodium, potassium, calcium or magnesium.

Alternatively, the sodium salt of the product of step (d) can be formed by reation with a metal hydride such as sodium hydride. The resulting sodium salt can then be reacted with a carbamoyl chloride in an inert solvent such as tetrahydrofuran to obtain products as obtained in the ($e_2$) reaction.

The 1 - (carbamoyl) - N - (carbamoyloxy)thioformidate products of step (e) can be isolated by conventional procedures such as filtration or extraction.

Of the steps (a) through (e) the most important is step (b) which provides an advantageous method of preparing the hydroxamoyl chloride. One preferred sequence of reation is to chlorinate in step (a) in the absence of a solvent and operatively combine steps (a) through (d), carrying out steps (b), (c) and (d) in an alcohol or water.

The process of this invention is further illustrated in the following examples wherein parts and percentages are by weight unless otherwise noted.

EXAMPLE I

To 130.1 parts of ethyl acetoacetate is added 141.7 parts of sulfuryl chloride over about one hour at 30–35° C. After addition is complete the reaction mixture is held at 50° C. for 30 minutes, and then briefly sparged with nitrogen.

To the resulting ethyl 2-chloroacetoacetate is added 394 parts of ethanol. In a separate vessel 200 parts of 36% hydrochloric acid is added to 145 parts of sodium nitrite and 104 parts of ethanol in 100 parts of water. The ethyl nitrite evolved is collected in a chilled trap. To the ethanolic solution of ethyl 2-chloroaceotacetate is added 75 parts of ethyl nitrite in one hour at 5° C. The reaction mixture is stirred at 5° C. for a further four hours and then allowed to rise slowly to ambient temperature.

The reaction mixture, which contains 1-ethoxycarbonylformhydroxamoyl chloride, is then cooled to −10° C. and 60 parts of methyl mercaptan is added, followed by the gradual addition of about 160 parts of 50% aqueous sodium hydroxide solution at −10° to −5° C., so that a stable pH of 7 is obtained. Most of the solvent is removed under reduced pressure. The residue is mixed with 400 parts of water and extracted with dichloromethane. After evaporation of the dichloromethane under reduced pressure, a residue of crude methyl 1-ethoxycarbonyl - N - hydroxythiformimidate is obtained. This product is dissolved in 200 parts of methanol and 100 parts of anhydrous dimethylamine is added below 30° C. The mixture is then allowed to stand at ambient temperatures for several hours. Removal of solvent and excess amine under reduced pressure yields 101 parts of methyl 1 - (dimethylcarbamoyl) - N - hydroxythioformimidate.

To a suspension of 70 parts of methyl 1-(dimethylcarbamoyl) - N - hydroxythioformimidate and ½ part of triethylenediamine in 350 parts of acetone at 40° C. is added slowly 27 parts of methyl isocyanate. The temperature of the reaction mass rises to 58° C. during the addition. After the temperature of the reaction mass has subsided to 25° C., the solvent is evaporated under reduced pressure, and the resulting residue crystallized. Recrystallization from benzene gives an isomer of methyl 1 - (dimethylcarbamoyl) - N - (methylcarbamoyloxy)-thioformimidate, melting point 109–110° C. Recrystallization from water gives the other isomer of methyl 1 - (dimethylcarbamoyl) - N - (methylcarbamoyloxy)-thioformimidate, melting point 101–103° C.

Similar results are obtained in the above example by substituting equivalent amounts of methyl acetoacetate or isopropyl acetoacetate for the ethyl acetoacetate. Likewise equivalent quantities of methyl nitrite or isopropyl nitrite can be substituted for the ethyl nitrite in Example I.

The compounds of Table I are prepared by the procedures of Example I, using the mercaptans, amines and isocyanates listed in place of the methyl mercaptan, dimethylamine and methyl isocyanate of Example I.

TABLE I

| Mercaptan | Amine | Isocyanate | Product |
|---|---|---|---|
| Ethyl mercaptan | Dimethylamine | Methyl isocyanate | Ethyl 1-dimethylcarbamoyl-N-(methylcarbamoyloxy)thioformimidate. |
| Allyl mercaptan | do | do | Allyl 1-dimethylcarbamoyl-N-(methylcarbamoyloxy)thioformimidate. |
| But-2-enyl mercaptan | do | Ethyl isocyanate | But-2-enyl 1-dimethylcarbamoyl-N-(ethylcarbamoyloxy)thioformimidate. |
| Isopropyl mercaptan | do | Allyl isocyanate | Isopropyl 1-dimethylcarbamoyl-N-(allylcarbamoyloxy)thioformimidate. |
| Methyl mercaptan | do | Propargyl isocyanate | Methyl 1-dimethylcarbamoyl-N-(propargylcarbamoyloxy)thioformimidate. |
| Propyl mercaptan | do | Methyl isocyanate | Propyl 1-dimethylcarbamoyl-N-(methylcarbamoyloxy)thioformimidate. |
| Allyl mercaptan | do | Allyl isocyanate | Allyl 1-dimethylcarbamoyl-N-(allylcarbamoyloxy)thioformimidate. |
| Isopropyl mercaptan | do | Methyl isocyanate | Isopropyl 1-dimethylcarbamoyl-N-(methylcarbamoyloxy)thioformimidate. |
| Butyl mercaptan | do | do | Butyl 1-dimethylcarbamoyl-N-(methylcarbamoyloxy)thioformimidate. |
| sec-Butyl mercaptan | do | do | sec-Butyl 1-dimethylcarbamoyl-N-(methylcarbamoyloxy)formimidate. |
| tert-Butyl mercaptan | do | do | tert-Butyl 1-dimethylcarbamoyl-N-(methylcarbamoyloxy)thioformimidate. |
| Methyl mercaptan | do | Ethyl isocyanate | Methyl 1-dimethylcarbamoyl-N-(ethylcarbamoyloxy)thioformimidate. |
| Butyl mercaptan | do | do | Butyl 1-dimethylcarbamoyl-N-(ethylcarbamoyloxy)thioformimidate. |
| Methyl mercaptan | do | Isopropyl isocyanate | Methyl 1-dimethylcarbamoyl-N-(isopropylcarbamoyloxy)thioformimidate. |
| Butyl mercaptan | do | do | Butyl 1-dimethylcarbamoyl-N-(isopropylcarbamoyloxy)thioformimidate. |
| Allyl mercaptan | do | Propyl isocyanate | Allyl 1-dimethylcarbamoyl-N-(propylcarbamoyloxy)thioformimidate. |
| Methyl mercaptan | do | Allyl isocyanate | Methyl 1-dimethylcarbamoyl-N-(allylcarbamoyloxy)thioformimidate. |
| Butyl mercaptan | do | do | Butyl 1-dimethylcarbamoyl-N-(allylcarbamoyloxy)thioformimidate. |
| Allyl mercaptan | do | Propargyl isocyanate | Allyl 1-dimethylcarbamoyl-N-(propargylcarbamoyloxy)thioformimidate. |
| Methyl mercaptan | Methylamine | Methyl isocyanate | Methyl 1-(methylcarbamoyl)-N-(methylcarbamoyloxy)thioformimidate. |
| Do | Butylamine | do | Methyl 1-(butylcarbamoyl)-N-(methylcarbamoyloxy)thioformimidate. |
| Isopropyl mercaptan | Cyclopropylamine | do | Isopropyl 1-(cyclopropylcarbamoyl)-N-(methylcarbamoyloxy)thioformimidate. |
| Allyl mercaptan | N,O-dimethylhydroxylamine | Ethyl isocyanate | Allyl 1-(N-methoxy-N-methylcarbamoyl)-N-(ethylcarbamoyloxy)thioformimidate. |
| Butyl mercaptan | Allylamine | do | Butyl 1-(allylcarbamoyl)-N-(ethylcarbamoyloxy thioformimidate. |
| Methyl mercaptan | Diallylamine | Allyl isocyanate | Methyl 1-(diallylcarbamoyl)-N-(allylcarbamoyloxy)thioformimidate. |
| Ethyl mercaptan | Isopropylamine | do | Ethyl 1-(isopropylcarbamoyl)-N-(allylcarbamoyloxy)thioformimidate. |
| Methyl mercaptan | Ethylamine | Propargyl isocyanate | Methyl 1-(ethylcarbamoyl)-N-(propargylcarbamoyloxy)thioformimidate. |
| Do | Diethylamine | Methyl isocyanate | Methyl 1-(diethylcarbamoyl)-N-(methylcarbamoyloxy)thioformimidate. |
| Do | Diisopropylamine | do | Methyl 1-(diisopropylcarbamoyl)-N-(methylcarbamoyloxy)thioformimidate. |
| Ethyl mercaptan | But-2-enylamide | Isopropyl isocyanate | Ethyl 1-(but-2-enylcarbamoyl)-N-isopropylcarbamoyloxy)thioformimidate. |

TABLE I.—Continued

| Mercaptan | Amine | Isocyanate | Product |
|---|---|---|---|
| Methyl mercaptan | Aziridine | Methyl isocyanate | Methyl 1-(aziridinocarbonyl)-N-(methylcarbamoyloxy)thioformimidate. |
| Do | Hexahydroazepine | do | Methyl 1-(hexahydroazepinocarbonyl)-N-(methylcarbamoyloxy)thioformimidate. |
| Do | Pyrrolidine | do | Methyl 1-(pyrrolidinocarbonyl)-N-(methylcarbamoyloxy)thioformimidate. |
| Do | Methylamine | Allyl isocyanate | Methyl 1-(methylcarbamoyl)-N-(allylcarbamoyloxy)thioformimidate. |
| Do | Allylamine | Propargyl isocyanate | Methyl 1-(allylcarbamoyl)-N-(propargylcarbamoyloxy)thioformimidate. |
| Do | N,O-dimethylhydroxylamine | Methyl isocyanate | Methyl 1-(N-methoxy-N-methylcarbamoyl)-N-(methylcarbamoyloxy)thioformimidate. |
| Do | N-methyl-N-ethylamine | Allyl isocyanate | Methyl 1-(N-methyl-N-ethylcarbamoyl)-N-(allylcarbamoyloxy)thioformimidate. |
| Ethyl mercaptan | Piperidine | do | Ethyl 1-(piperidinocarbonyl)-N-(allylcarbamoyloxy)thioformimidate. |
| Do | do | Butyl isocyanate | Ethyl 1-(piperidinocarbonyl)-N-(butylcarbamoyloxy)thioformimidate. |
| Butyl mercaptan | do | Methyl isocyanate | Butyl 1-(piperidinocarbonyl)-N-(methylcarbamoyloxy)thioformimidate. |
| Do | do | Butyl isocyanate | Butyl 1-(piperidinocarbonyl)-N-(butylcarbamoyloxy)thioformimidate. |
| Methyl mercaptan | N-methyl-N-butylamine | Methyl isocyanate | Methyl 1-(N-methyl-N-butylcarbamoyl)-N-(methylcarbamoyloxy)thioformimidate. |
| Do | N-methyl-N-allylamine | do | Methyl 1-(N-methyl-N-allylcarbamoyl)-N-(methylcarbamoyloxy)thioformimidate. |

EXAMPLE II

Crude methyl 1 - ethoxycarbonyl - N - hydroxythioformimidate obtained as in Example I above, is dissolved in 200 parts of concentrated aqueous ammonia at a temperature below 30° C. The solution is allowed to stand overnight. After removal of a small amount of undissolved material by filtration, the filtrate is concentrated under reduced pressure to give 105 parts of methyl 1-(carbamoyl)-N-hydroxythioformimidate, melting point 163–164° C.

To a suspension of 400 parts of methyl 1-(carbamoyl)-N-hydroxythioformimidate and 1 part of triethylenediamine in 2000 parts of acetone at 40° C. is added slowly 171 parts of methyl isocyanate. The temperature of the reaction mixture rises to 58° C. during the addition and then subsides to 25° C. At this point the reaction mass is cooled to 0° C. and 547 parts of the product methyl 1 - (carbamoyl) - N - (methylcarbamoyloxy)thioformimidate is filtered off. The product has a melting point of 161–165° C.

The compounds of Table II are prepared by the procedures of Examples I and II, using the mercaptans and isocyanates listed in place of methyl mercaptan and methyl isocyanate of Examples I and II.

EXAMPLE III

To a solution of 164.6 parts of distilled ethyl 2-chloroacetoacetate in 394 parts of ethanol is added 77 parts of ethyl nitrite, prepared as described in Example I, in one hour at 5° C. The reaction mixture is stirred at 5° C. for a further four hours and then allowed to rise slowly to ambient temperature. The reaction mixture is then cooled to −10° C., and 60 parts of methyl mercaptan is added, followed by the gradual addition of about 80 parts of 50% aqueous sodium hydroxide solution at −10° to −5° C., so that a stable pH of 7 is obtained. Most of the solvent is removed under reduced pressure. The residue is mixed with 400 parts of water and extracted with dichloromethane. After evaporation of the dichloromethane under reduced pressure, 135 parts of crude methyl 1-ethoxycarbonyl-N-hydroxythioformimidate is obtained. It is recrystallized from benzenecyclohexane to give pure material, melting point 53–55° C.

EXAMPLE IV

To a solution of 164.6 parts of distilled ethyl 2-chloroacetoacetate in 394 parts of ethanol is added at 5° C. over one hour 77 parts of ethyl nitrite, prepared as described in Example I. The reaction mixture is stirred at

TABLE II

| Mercaptan | Isocyanate | Product |
|---|---|---|
| Ethyl mercaptan | Methyl isocyanate | Ethyl 1-carbamoyl-N-(methylcarbamoyloxy)-thioformimidate. |
| Allyl mercaptan | do | Allyl 1-carbamoyl-N-(methylcarbamoyloxy)-thioformimidate. |
| But-2-enyl mercaptan | Ethyl isocyanate | But-2-enyl 1-carbamoyl-N-(ethylcarbamoyloxy)-thioformimidate. |
| Isopropyl mercaptan | Allyl isocyanate | Isopropyl 1-carbamoyl-N-(allylcarbamoyloxy)-thioformimidate. |
| Methyl mercaptan | Propargyl isocyanate | Methyl 1-carbamoyl-N-(propargylcarbamoyloxy)-thioformimidate. |
| Propyl mercaptan | Methyl isocyanate | Propyl 1-carbamoyl-N-(methylcarbamoyloxy)-thioformimidate. |
| Allyl mercaptan | Allyl isocyanate | Allyl 1-carbamoyl-N-(allylcarbamoyloxy)-thioformimidate. |
| Isopropyl mercaptan | Methyl isocyanate | Isopropyl 1-carbamoyl-N-(methylcarbamoyloxy)-thioformimidate. |
| Butyl mercaptan | do | Butyl 1-carbamoyl-N-(methylcarbamoyloxy)-thioformimidate. |
| sec-Butyl mercaptan | do | sec-Butyl 1-carbamoyl-N-(methylcarbamoyloxy)thioformimidate. |
| tert-Butyl mercaptan | Methyl isocyanate | tert-Butyl 1-carbamoyl-N-(methylcarbamoyloxy)thioformimidate. |
| Methyl mercaptan | Ethyl isocyanate | Methyl 1-carbamoyl-N-(ethylcarbamoyloxy)-thioformimidate. |
| Butyl mercaptan | do | Butyl 1-carbamoyl-N-(ethylcarbamoyloxy)-thioformimidate. |
| Methyl mercaptan | Isopropyl isocyanate | Methyl 1-carbamoyl-N-(isopropylcarbamoyloxy)-thioformimidate. |
| Butyl mercaptan | do | Butyl 1-carbamoyl-N-(isopropylcarbamoyloxy)-thioformimidate. |
| Allyl mercaptan | do | Allyl 1-carbamoyl-N-(isopropylcarbamoyloxy)-thioformimidate. |
| Do | Propyl isocyanate | Allyl 1-carbamoyl-N-(propylcarbamoyloxy)-thioformimidate. |
| Methyl mercaptan | Allyl isocyanate | Methyl 1-carbamoyl-N-(allylcarbamoyloxy)-thioformimidate. |
| Butyl mercaptan | do | Butyl 1-carbamoyl-N-(allylcarbamoyloxy)-thioformimidate. |
| Allyl mercaptan | Propargyl isocyanate | Allyl 1-carbamoyl-N-(propargylcarbamoyloxy)-thioformimidate. |

5° C. for a further four hours at 5° C., and is then allowed to rise to ambient temperature. The solvent is evaporated at reduced pressure. The crystalline residue (150 parts) is then slurried with 118 parts of cyclohexane, and the crystals filtered off, washed with a further 40 parts of cyclohexane and dried to give 126 parts of relatively pure 1 - (ethoxycarbonyl)formhydroxamoyl chloride melting at 68–78° C. Recrystallization from benzene gives material melting at 79–80.5° C.

EXAMPLE V

To a stirred suspension of 48 parts of 50% sodium hydride and mineral oil in 648 parts of tetrahydrofuran is added portion-wise over a one-hour period 114 parts of methyl 1 - (carbamoyl)-N-hydroxythioformimidate. The temperature is maintained at 20 to 30° C. After subsidence of hydrogen evolution, 107.5 parts of dimethylcarbamoyl chloride is added dropwise at 15–25° C. Stirring is continued for one hour after the completion of the addition. The inorganic solids are then removed by filtration and the methyl 1-carbamoyl-N-(dimethylcarbamoyloxy)thioformimidate is recovered by removal of the solvent under reduced pressure.

The compounds of Table III are prepared according to the procedures of Example V, using the N-hydroxythioformimidates and carbamoyl chlorides listed in place of methyl 1-(carbamoyl)-N-hydroxythioformimidate and dimethylcarbamoyl chloride.

(b) reacting the product of step (a) with an alkyl nitrite in the presence of hydrogen chloride and in the presence of water, methanol, ethanol, isopropanol or their mixtures, at a temperature between —20° C. and 50° C.

(c) mixing the product of step (b) with an alkyl mercaptan of the formula $$R_1SH$$

wherein $R_1$ is as defined above; and then raising the pH to the range of 5–9 by the addition of a hydroxide carbonate or bicarbonate of sodium, potassium, calcium or magnesium;

(d) aminating the product of step (c) with about 2 moles per mole of product of ammonia, a primary amine or a secondary amine in the presence of water, methanol, ethanol, isopropanol or their mixtures; and (e) reacting the product of (d) with either
  (1) a carbamoyl chloride in the presence of a base; or
  (2) an isocyanate in the presence or absence of a basic catalyst; in water, acetone, methylene chloride, methyl ethyl ketone or methyl isobutyl ketone.

2. The process of claim 1 wherein the amination is carried out with ammonia.

TABLE III

| N-hydroxythioformimidate | Carbamoyl chloride | Product |
| --- | --- | --- |
| Methyl 1-carbamoyl-N-hydroxythioformimidate | N-allyl-N-methylcarbamoyl chloride | Methyl 1-carbamoyl-N-(N-allyl-N-methylcarbamoyloxy)thioformimidate. |
| Do | N-methyl-N-propargylcarbamoyl chloride | Methyl 1-carbamoyl-N-(N-methyl-N-propargylcarbamoyloxy)thioformimidate. |
| Do | N-methyl-N-propylcarbamoyl chloride | Methyl 1-carbamoyl-N-(N-methyl-N-propylcarbamoyloxy)thioformimidate. |
| Do | N-ethyl-N-methylcarbamoylchloride | Methyl 1-carbamoyl-N-(N-ethyl-N-methylcarbamoyloxy)thioformimidate. |
| Methyl 1-methylcarbamoyl-N-hydroxythioformimidate. | Dimethylcarbamoyl chloride | Methyl 1-(methylcarbamoyd)-N-dimethylcarbamoyloxy)thioformimidate. |
| Methyl 1-dimethylcarbamoyl-N-hydroxythioformimidate. | do | Methyl 1-(dimethylcarbamoyl)-N-(dimethylcarbamoyloxy)thioformimidate. |
| Methyl 1-cyclopentylcarbamoyl-N-hydroxythioformimidate. | do | Methyl 1-(cyclopentylcarbamoyl)-N-(dimethylcarbamoyloxy)thioformimidate. |
| Propyl 1-carbamoyl-N-hydroxythioformimidate | do | Propyl 1-carbamoyl-N-(dimethylcarbamoyloxy)thioformimidate. |
| Ethyl 1-carbamoyl-N-hydroxythioformimidate | do | Ethyl 1-carbamoyl-N-(dimethylcarbamoyloxy)-thioformimidate. |
| Butyl 1-carbamoyl-N-hydroxythioformimidate | do | Butyl 1-carbamoyl-N-(dimethylcarbamoyloxy)-thioformimidate. |
| Methyl 1-piperidinocarbonyl-N-hydroxythioformimidate. | do | Methyl 1-piperidinocarbonyl-N-(dimethylcarbamoyloxy)thioformimidate. |
| Allyl 1carbamoyl-N-hydroxythioformimidate | do | Allyl 1-carbamoyl-N-(dimethylcarbamoyloxy) thioformimidate. |
| But-2-enyl 1-carbamoyl-N-hydroxythioformimidate. | do | But-2-enyl 1-carbamoyl-N-(dimethylcarbamoyloxy)-thioformimidate. |

I claim:

1. A process for preparing alkyl 1-(carbamoyl)-N-(carbamoyloxy)thioformimidates of the formula (1) 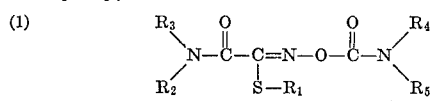

wherein
$R_1$ is alkyl of 1 through 4 carbon atoms or alkenyl of 3 through 4 carbon atoms;
$R_2$ is hydrogen, alkyl of 1 through 4 carbon atoms, alkenyl of 3 through 4 carbon atoms, methoxy or cycloalkyl of 3 through 5 carbon atoms;
$R_3$ is hydrogen, alkyl of 1 through 4 carbon atoms, or alkenyl of 3 through 4 carbon atoms; with the proviso that $R_2$ and $R_3$ can be taken together and are alkylene of 2 through 6 carbon atoms, and with the limitation that $R_2$ and $R_3$ never total more than 7 carbon atoms;
$R_4$ is alkyl of 1 through 3 carbon atoms, allyl or propargyl; and
$R_5$ is hydrogen or methyl;
by the steps comprising
  (a) chlorinating methyl, ethyl, or isopropyl acetoacetate in the presence or absence of water, methanol, ethanol, isopropanol or their mixtures at a temperature between 0° C. and 70° C.;

3. The process of claim 1 wherein amination is carried out with dimethylamine.

4. The process of claim 1 wherein step (a) is carried out in water, using elemental chlorine as the chlorinating agent.

5. The process of claim 1 wherein step (a) is carried out in the absence of solvent using sulfuryl chloride as the chlorinating agent.

6. The process of claim 1 wherein step (b) is carried out in ethanol.

7. The process of claim 1 wherein step (c) is carried out after cooling to a temperature below 20° C.

8. The process of claim 1 wherein step (d) is carried out in methanol, ethanol, isopropanol or their mixtures with water.

9. The process of claim 1 wherein excess ammonia or amine are removed after step (d) and prior to step (e).

10. The process of claim 1 wherein step (e) is carried out using an isocyanate and trimethylamine or triethylenediamine as the basic catalyst.

11. The process of claim 1 wherein step (e) is carried out using a carbamoyl chloride and triethylamine, trimethylamine, or a hydroxide, carbonate or bicarbonate of sodium, potassium, calcium or magnesium as the base.

12. The process of claim 1 wherein step (a) is carried out in the absence of a solvent and steps (b), (c) and (d)

are operatively combined in water, methanol, ethanol, isopropanol or their mixtures.

13. A process for preparing hydroxamoyl chlorides of the formula

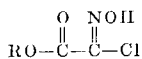

wherein
R is methyl, ethyl or isopropyl
by the steps comprising
(a) chlorinating methyl, ethyl or isopropyl acetoacetate in the presence or absence of water, methanol, ethanol, isopropanol or their mixtures at a temperature between 0° C. and 70° C.;
(b) reacting the product of step (a) with an alkyl nitrite in the presence of hydrogen chloride and in the presence of water, methanol, ethanol, isopropanol or their mixtures, at a temperature between −20° C. and 50° C.

14. The process of claim 13 wherein step (a) is carried out in water, using elemental chlorine as the chlorinating agent.

15. The process of claim 13 wherein step (a) is carried out in the absence of a solvent using sulfuryl chloride as the chlorinating agent.

16. The process of claim 13 wherein step (b) is carried out in ethanol.

17. A process for nitrosating alkyl esters of 2-chloroacetoacetates of the formula

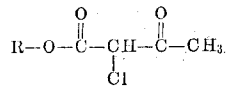

wherein R is methyl, ethyl or isopropyl; comprising reacting the ester with an alkyl nitrite at a temperature between −20° and 50° C. in water, methanol, ethanol, isopropanol, or their mixtures, and in the presence of hydrogen chloride.

18. The process of claim 17 wherein the reaction is carried out at a temperature between 0 and 10° C.

19. The process of claim 17 wherein the reaction is carried out in ethanol.

References Cited
UNITED STATES PATENTS 3,256,330   6/1966   Kilsheimer et al. ____ 260—566A HENRY R. JILES, Primary Examiner S. D. WINTERS, Assistant Examiner U.S. Cl. X.R.

260—239, 293.4, 326.3, 453, 481, 483, 561, 566